_United States Patent Office_

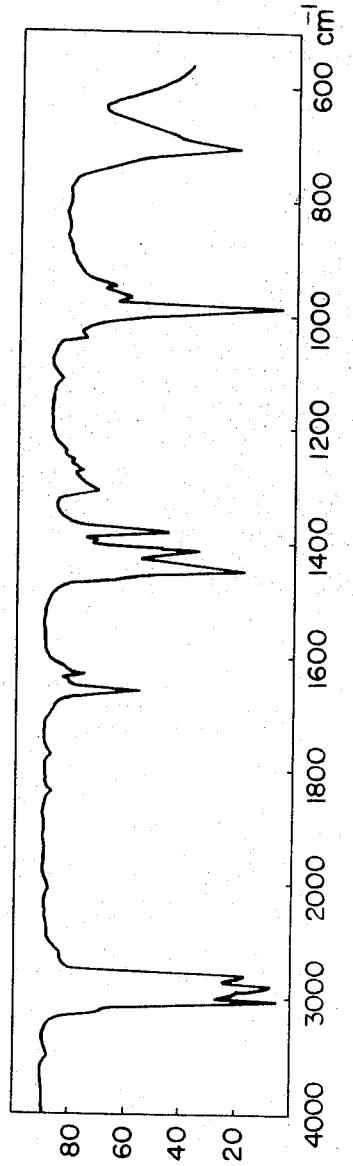
FIG.1 INFRARED SPECTRUM OF N-TRIDECATETRAENE-(2,4,7,11)
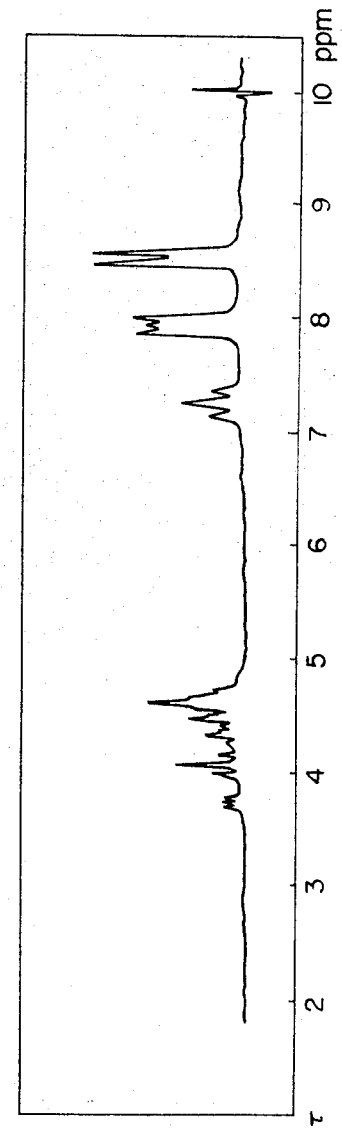
FIG.2 NMR SPECTRUM OF N-TRIDECATETRAENE-(2,4,7,11)

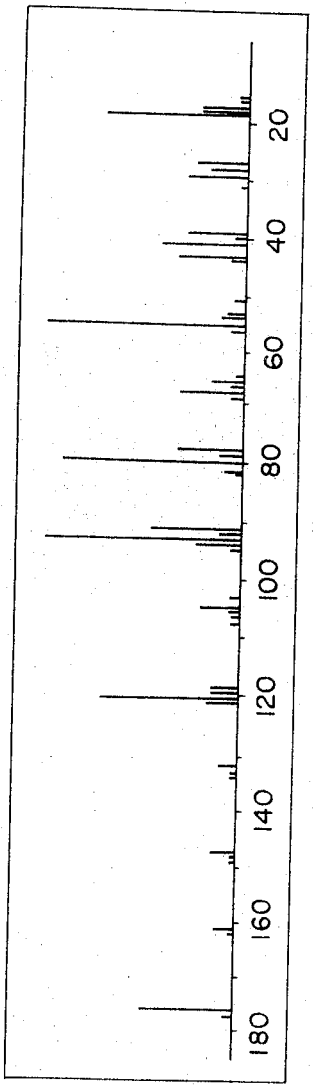

3,663,639
Patented May 16, 1972

3,663,639
OPEN-CHAIN OLIGOMERS AND PRODUCTION OF THE SAME
Hiroyuki Morikawa, Ami-machi, and Junji Furukawa, Kyoto-shi, Japan, assignors to Mitsubishi Petrochemical Company Limited, Tokyo-to, Japan
Filed Mar. 31, 1970, Ser. No. 24,214
Claims priority, application Japan, Apr. 5, 1969, 44/26,504
Int. Cl. C07c 11/12, 11/100
U.S. Cl. 260—677 R                14 Claims

ABSTRACT OF THE DISCLOSURE

Open-chain co-trimers of 1,3-butadiene with 1,3-pentadiene are produced by the catalytic co-oligomerization of the dienes in which the catalyst is a mixture of (I) a phosphorus compound of the formula $PO(OR)_3$ or $P(OR)_3$, (II) a tetravalent halo-, alkoxy or alkoxyhalo-titanium compound of the formula $Ti(OR')_nX_{4-n}$, and (III) alkyl- or alkylhalo-aluminium compound of the formula $AlR''_lY_m$.

BACKGROUND OF THE INVENTION

This invention relates generally to open-chain 1,3-diene oligomers, especially open-chain co-oligomers of 1,3-butadiene with 1,3-pentadiene, which are believed to be novel compounds. This invention also relates to the production of the oligomers.

The catalytic trimerization of a 1,3-diene is known. Various researches have been made inclusive of proposals of catalysts made of a certain titanium compound and a certain organoaluminium compound.

These researches, however, concern the production of cyclic trimers and, in addition, of homotrimers. We have never heard of the production of open-chain oligomers, especially co-oligomers, out of the mixture of 1,3-dienes.

It is suggested that a catalyst made of a titanium compound and an $AlEt_2Cl$ compound described in Japanese patent publication No. 2,372/60 and a catalyst made of a titanium compound, $AlEt_2Cl$ compound and a phosphorus compound described in Japanese patent publication No. 12,697/65 are capable of production of only cyclic homo-oligomers out of a 1,3-diene. In fact, according to the conventional processes, the products are cyclic oligomers, and no open-chain oligomers are produced.

SUMMARY OF THE INVENTION

It is an object of the present invention to provide novel open-chain oligomers.

It is another object of the invention to provide a process for producing open-chain oligomers.

According to the present invention, briefly summarized, there is provided an open-chain oligomer which is a co-trimer of 1,3-butadiene with 1,3-pentadiene.

According to the present invention in another aspect thereof, there is provided a process which comprises causing a mixture of 1,3-butadiene and 1,3-pentadiene to be contacted by a catalyst resultant from the combination of (I) a phosphorus compound selected from the group consisting of (1) phosphate ester derivatives of the formula $PO(OR)_3$ and (2) phosphite ester derivatives of the formula $P(OR)_3$, (II) a titanium compound of the formula $Ti(OR')_nX_{4-n}$, and (III) an aluminium compound of the formula $AlR''_lY_m$ thereby to oligomerize said dienes into an open chain oligomer. In these formulas, R is an alkyl, an aryl, a haloalkyl, or a haloaryl containing 1 to 10 carbon atoms, R' is the same as or different from R and is an alkyl or an aryl containing 1 to 10 carbon atoms, X is a halogen, $n$ is 0, 1, 2, 3, or 4. R'' is the same as or different from R or R' and is an alkyl or an aryl containing 1 to 10 carbon atoms, $l+m$ is 3, and $l$ is 1.5, 2, or 3, and $m$ is 0, 1, or 1.5.

The present process thus calls for several essential factors, which are critical for the production of the open-chain oligomers. For example, substitution of the phosphorus compound (I) in the catalyst components by, for example, a phosphine $PR_3$, a phosphorus halide $PCl_3$ or a halophosphine instead of a phosphate (1) or a phosphite (2) will produce cyclic products, and substitution of the aluminium compound (III) by a dihaloalkylaluminium of the formula $AlR''X_2$ will produce higher polymers to an overwhelming extent. The aluminium compounds containing an alkoxyl group are also improper. Further, the combination of 1,3-dienes according to the present invention is also critical, and only very low selectivity will be obtainable out of the combinations of 1,3-dienes other than that of 1,3-butadiene and 1,3-pentadiene.

BRIEF DESCRIPTION OF THE DRAWING

In the drawing:

FIG. 1 is a chart obtained from infrared spectroscopy;
FIG. 2 is a chart obtained from nuclear magnetic resonance analysis; and
FIG. 3 is a chart obtained from mass spectrometry, all of which figures indicate the characteristics of normal tri-decatetraene-(2,4,7,11) of the invention.

DETAILED DESCRIPTION

One component of the catalyst to be used with the expectation of the above described effects is a phosphorus compound (I) which is either a phosphate ester (1) or a phosphite ester (2) expressed by formula $PO(OR)_3$ or $P(OR)_3$ as defined hereinbefore. As a halogen in the haloalkyl or haloaryl of the substituent R, chlorine and bromine, among others, are typical. The aryl may be an alkyl-substituted aryl, the number of carbons in total being within the prescribed range, viz, 1–10.

Typical examples of the phosphorus compounds which may be used singly or in admixture are as follows:

(1) Phosphate ester derivatives ($PO(OR)_3$)

trimethyl phosphate
triethyl phosphate
tripropyl phosphate
tributyl phosphate
triamyl phosphate
triphenyl phosphate
tricresyl phosphate
tri-2-bromoethyl phosphate (2) Phosphite ester derivatives ($P(OR)_3$)

trimethyl phosphite
triethyl phosphite
tripropyl phosphite
tributyl phosphite
tridecyl phosphite
triphenyl phosphite
tricresyl phosphite
tri-2-bromoethyl phosphite
tri-2-chloroethyl phosphite Another component of the catalyst is a titanium compound (II) expressed by the formula $Ti(OR')_nX_{4-n}$ as defined hereinbefore. As the substituent R', a lower alkyl having less than about 6 carbon atoms and phenyl or a methyl-substituted derivative thereof, among others, are preferable, and a typical halogen is chlorine.

Typical examples of the titanium compounds which may be used singly or in admixture are as follows:

(3) Titanium compound $(Ti(OR')_nX_{4-n})$ titanium tetramethoxide
titanium tetraethoxide
titanium tetrapropoxide
titanium tetrabutoxide
titanium tetraphenoxide
titanium tetrachloride
titanium tributoxychloride
titanium dibutoxydichloride
titanium butoxytrichloride An aluminium compound expressed by the formula $AlR''_lY_m$ as defined hereinbefore, which is a further component of the catalyst, may be classified according to the values of $l$ and $m$ into three groups, viz $AlR''_2Y$ ($l=2$, $m=1$), $AlR''_{1.5}Y_{1.5}$ or sesquicompound $Al_2R''_3Y_3$ ($l=1.5$, $m=1.5$), and $AlR''_3$ ($l=3$, $m=0$). In either case a lower alkyl having less than about 6 carbon atoms and phenyl or a methyl-substituted derivative thereof are preferable as the substituent $R''$. A typical halogen Y is chlorine.

Typical examples of the aluminium compounds which may be used singly or in admixture are as follows.

(4) Aluminium compound $(AlR''_2Y)$ dimethylaluminium chloride
diethylaluminium chloride
diisopropylaluminium chloride
dibutylaluminium chloride
dihexylaluminium chloride (5) Aluminium compound $(Al_2R''_3Y_3)$ ethylaluminium sesquichloride
isopropylaluminium sesquichloride (6) Aluminium compound $(AlR''_3)$ trimethylaluminium
triethylaluminium
tripropylaluminium
tributyl aluminium
trihexylaluminium The ratio between the three components used in the catalyst is selected to suit each case. In general, it is preferable that the phosphorus compound/titanium compound mole ratio be 0.3:1–2:1 more preferably 0.5:1–1.5:1, and still more preferably 1:1. The aluminium compound/titanium compound mole ratio is preferably 1–50, more preferably 3–20, wherein, in the case of a sesquicompound used as the aluminium compound, one mole of a sesquicompound is to be taken as one mole of the aluminium compound.

The catalyst according to the present invention, which is made of the above essential three components, may in general be produced by simultaneous or step-wise admixing of the components. In order to obtain a catalyst highly active for the production of the open-chain oligomers, however, it is preferable to bring about the contact of the phosphorus compound (I) with the titanium compound (II) first and then add thereto the aluminium compound (III).

In one preferred embodiment of the invention, a complex is produced from the contact between the phosphorus compound (I) and the titanium compound (II), and then immediately or after some time interval, the aluminium compound (III) is added to the complex to obtain the present catalyst. The formation of the complex can be detected by the formation of a red to dark red precipitate from a colorless liquid of the phosphorus compound and a colorless liquid of the titanium compound. While the complexes can be isolated as such or in the form of a benzene solution in some instances, it is preferable to produce the complexes within a liquid polymerization medium in situ and then add thereto the aluminium compound since the complexes are so unstable that they can be destroyed at once upon contact with moisture.

Another essential feature of the present invention is that specific dienes should be employed. While we do not know the exact reason for this, and we do not wish to be restricted by any theory, it is supposed that the terminal methyl group in 1,3-pentadiene plays a role favorable for the production of the open-chain oligomers in the catalytic effect of the specific catalyst.

Any suitable ratio of 1,3-butadiene ($C_4$) to 1,3-pentadiene ($C_5$) may be employed, the $C_4/C_5$ mole ratio of 1/5 to 5/1 being preferable in general. Both dienes are generally introduced to the polymerization in admixture to contact the catalyst.

The co-oligomerization of 1,3-butadiene with 1,3-pentadiene with the use of the catalyst to produce the open-chain oligomer may be carried out in the presence or absence of a solvent or a liquid polymerization medium, although the presence of a solvent is preferable in general. A typical solvent is a hydrocarbon such as benzene, toluene, xylene, or hexane. 1,3-butadiene and 1,3-pentadiene are introduced separately or as an admixture to the solvent in the polymerization system. In general, the oligomerization is carried out at a temperature of 0° C. to 100° C., preferably 20° C. to 70° C., and under atmospheric or superatmospheric pressure.

Upon completion of the reaction, the reaction product is subjected to distillation to evaporate off the solvent used and to effect fractional distillation thereby to obtain n-tridecatetraene-(2,4,7,11) and a mixture of n- and isotetradecatetraene as the open-chain trimers, as well as a certain amount of methylcyclododecatriene and other oligomers in certain instances.

The open-chain co-trimers of 1,3-butadiene with 1,3-pentadiene according to our invention are either tridecatetraenes, the $C_4/C_5$ mole ratio being 2/1, or tetradecatetraenes, the $C_4/C_5$ mole ratio being 1/2. These are useful as important intermediate products for organic synthesis and are hydrogenated to produce $C_{13}$ and $C_{14}$ paraffins such as normal tridecane which, in turn, is useful in the fields of synthetic detergent production and of petroleum fermentation.

In order to indicate still more fully the nature and utility of the invention the following examples of practice illustrating a preferred embodiment of the invention are set forth, it being understood that these examples are presented as illustrative only and that they are not intended to limit the scope of the invention.

Example 1

A pressure bottle of 150 cubic centimeters (cc.) capacity is flushed with nitrogen to replace the air therein with nitrogen, and 40 cc. of benzene, 1 millimole (mM.) of titanium butoxtrichloride and 1 mM. of tricresyl phosphite are introduced to the bottle and agitated therein for 30 minutes (min.). Thereafter, 4 mM. of ethylaluminium chloride, 7 grammes (g.) of 1,3-butadiene and 9 g. of 1,3-pentadiene are introduced. The resultant mixture is agitated for 10 hours (hr.) at 40° C. A methanolic hydrochloric acid is then added to destroy the catalyst, and the polymerization mass is concentrated by evaporation of the solvent and is then subjected to fractional distillation under reduced pressure.

9.6 g. of a trimer fraction which boils at 50 to 100° C./2 to 2.5 mm. Hg is obtained, the selectivity of the open-chain oligomers being 64%.

The open-chain oligomers comprise 82% of normal tridecatetraene-(2,4,7,11) which boils at 77–78° C./2.5 mm. Hg (hereinafter referred to as n-$C_{13}$ tetraene), 5% of isotetradecatetraene which boils 80–82° C./2.5 mm. Hg (hereinafter referred to as i-$C_{14}$ tetraene), and 13% of normal tetradecatetraene which boils 82–84° C./2.5 mm. Hg (hereinafter referred to as n-$C_{14}$ tetraene).

The identification of n-tridecatetraene-(2,4,7,11),

H₃C—CH=CH—CH=CH—CH₂—CH=CH—
CH₂—CH₂—CH=CH—CH₃ is made with respect to the following points:
(1) Boiling point: 77–78° C./2.5 mm. Hg.
(2) Molecular weight (by cryoscopic method): 176.
(3) Elementary analysis: C, 88.7%; H, 11.3%. From these data, a formula $C_{13}H_{20}$ is given.
(4) Hydrogenation: Upon hydrogenation with a Pd-black catalyst, the product absorbs 4 moles of hydrogen to produce known n-tridecane.
(5) Reaction with maleic anhydride: The product has one mole of maleic anhydride added at room temperature. This shows the product has a conjugated double bond.
(6) Infra-red spectrum at room temperature (FIG. 1).

Absorption of double bond:
1660 cm.$^{-1}$, 1625 cm.$^{-1}$ (conjugate)
990 cm.$^{-1}$ (trans-conjugate)
955 cm.$^{-1}$ (trans)
710 cm.$^{-1}$ (cis)

No terminal vinyl (910 cm.$^{-1}$) is observed.

(7) Nuclear magnetic resonance spectrum in CDCl₃ at room temperature (FIG. 2).

3.7–4.7τ: olefinic proton (—CH=CH—)
7.11, 7.20, 7.30τ: methylene proton (—C=C—CH₂—C=C—)

7.86, 7.70, 7.96τ: methylene proton (—C=C—CH₂—CH₂—C=C—)

8.32, 8.47τ: methyl proton (—C=C—CH₃)

The ratio of the intensities of these peaks is 8:2:4:6, which coincides with that to be found on n-tridecantetraene-(2,4,7,11).

(8) Mass spectrum (FIG. 3).

Main peak (mass number):
176 parent (molecular) — $C_{13}H_{20}^+$
121 fragment — $C_9H_{13}^+$
93 fragment — $C_7H_9^+$
79 fragment — $C_6H_7^+$
67 fragment — $C_5H_7^+$
55 fragment — $C_4H_7^+$ This result coincides with that to be found on n-tridecatetraene-(2,4,7,11).

Example 2

The procedure of Example 1 is followed except that the materials used are:

benzene: 40 cc.
titanium diisopropoxydichloride: 1 mM.
triphenyl phosphite: 1 mM.
diethylaluminium chloride: 4 mM.
butadiene: 14 g.
pentadiene: 9 g.

14.7 g. of a trimer fraction is obtained. The open-chain oligomer selectivity is 51%, and the open-chain oligomers comprise:

n-$C_{13}$ tetraene: 95%
i-$C_{14}$ tetraene: 2%
n-$C_{14}$ tetraene: 3%

Example 3

The procedure of Example 1 is followed except for the use of the following materials.

benzene: 40 cc.
titanium triphenoxy chloride: 1 mM.
triphenyl phosphite: 1 mM.
diethylaluminium chloride: 8 mM.
butadiene: 7 g.
pentadiene: 9 g.

10.7 g. of a trimer fraction is obtained. The open-chain oligomer selectivity is 52%, and the open-chain oligomers comprise:

n-$C_{13}$ tetraene: 78%
i-$C_{14}$ tetraene: 6%
n-$C_{14}$ tetraene: 15%

Example 4

The procedure of Example 1 is followed except that the materials used are:

benzene: 40 cc.
titanium tetrachloride: 1 mM.
triphenyl phosphite: 1 mM.
diethylaluminium chloride: 3 mM.
butadiene: 7 g.
pentadiene: 9 g.

10.9 g. of a trimer fraction is obtained. The open-chain oligomer selectivity is 52%, and the open-chain oligomers comprise:

n-$C_{13}$ tetraene: 77%
i-$C_{14}$ tetraene: 7%
n-$C_{14}$ tetraene: 15%

Example 5

The procedure of Example 1 is followed, except that the materials used are:

benzene: 40 cc.
titanium tetrachloride: 1 mM.
triphenyl phosphite: 1 mM.
diethylaluminum chloride: 3 mM.
butadiene: 21 g.
pentadiene: 9 g.

20.3 g. of trimer fraction is obtained. The open-chain oligomer selectivity is 43%, and the open-chain oligomers comprise:

n-$C_{13}$ tetraene: 98%
i-$C_{14}$ tetraene: 0.7%
n-$C_{14}$ tetraene: 1.3%

Example 6

The procedure of Example 1 is followed, except that the materials used are:

benzene: 30 cc.
titanium tetrachloride: 1 mM.
tricesyl phosphite: 1 mM.
triethylaluminium: 2 mM.
butadiene: 7 g.
pentadiene: 9 g.

6.6 g. of a trimer fraction is obtained. The open-chain oligomer selectivity is 56%, and the open-chain oligomers comprise:

n-$C_{13}$ tetraene: 82%
i-$C_{14}$ tetraene: 6%
n-$C_{14}$ tetraene: 11%

Example 7

The procedure of Example 1 is followed, except that the materials used are:

toluene: 40 cc.
titanium tetrachloride: 1 mM.
tributyl phosphite: 1 mM.
dibutyl aluminium chloride: 3 mM.
butadiene: 7 g.
pentadiene: 9 g.

9.5 g. of a trimer fraction is obtained. The open-chain oligomer selectivity is 61%, and the open-chain oligomers comprise:

n-$C_{13}$ tetraene: 78%
i-$C_{14}$ tetraene: 6%
n-$C_{14}$ tetraene: 14%

Example 8

The procedure of Example 1 is followed, except that the materials used are:

hexane: 30 cc.
titanium tetrabutoxide: 1 mM.
triethyl phosphite: 1 mM.
diethylaluminium chloride: 10 mM.
butadiene: 7 g.
pentadiene: 9 g.

8.4 g. of a trimer fraction is obtained. The open-chain oligomer selectivity is 55%, and the open-chain oligomers comprise:

n-$C_{13}$ tetraene: 75%
i-$C_{14}$ tetraene: 8%
n-$C_{14}$ tetraene: 17%

Example 9

The procedure of Example 1 is followed, except that the materials used are:

heptane: 30 cc.
titanium methoxytrichloride: 1 mM.
trimethylphosphite: 1 mM.
diethylaluminium chloride: 4 mM.
butadiene: 7 g.
pentadiene: 9 g.

11.5 g. of a trimer fraction is obtained. The open-chain oligomer selectivity is 54%, and the open-chain oligomers comprise:

n-$C_{13}$ tetraene: 79%
i-$C_{14}$ tetraene: 6.5%
n-$C_{14}$ tetraene: 13.5%

Example 10

The procedure of Example 1 is followed, except that the materials used are:

benzene: 40 cc.
titanium tetrachloride: 1 mM.
tricresyl phosphite: 1.5 mM.
triisobutyl aluminium: 3 mM.
butadiene: 7 g.
pentadiene: 9 g.

6.8 g. of a trimer fraction is obtained. The open-chain oligomer selectivity is 63%, and the open-chain oligomers comprise:

n-$C_{13}$ tetraene: 84%
i-$C_{14}$ tetraene: 6%
n-$C_{14}$ tetraene: 10%

Example 11

The procedure of Example 1 is followed, except that the materials used are:

benzene: 40 cc.
titanium ethoxytrichloride: 1 mM.
tricresyl phosphite: 1 mM.
diethylaluminium chloride: 3 mM.
butadiene: 7 g.
pentadiene: 9 g.

8.7 g. of a trimer fraction is obtained. The open-chain oligomer selectivity is 40%, and the open-chain oligomers comprise:

n-$C_{13}$ tetraene: 83%
i-$C_{14}$ tetraene: 7%
n-$C_{14}$ tetraene: 10%

Example 12

The procedure of Example 1 is followed, except that the materials used are:

benzene: 40 cc.
titanium tetrachloride: 1 mM.
triethyl phosphate: 1 mM.
diethylaluminium chloride: 3 mM.
butadiene: 7 g.
pentadiene: 9 g.

8.1 g. of a trimer fraction is obtained. The open-chain oligomer selectivity is 41%, and the open-chain oligomers comprise:

n-$C_{13}$ tetraene: 76%
i-$C_{14}$ tetraene: 8%
n-$C_{14}$ tetraene: 16%

Example 13

The procedure of Example 1 is followed, except that the materials used are:

benzene: 40 cc.
titanium tetrachloride: 1 mM.
triphenyl phosphate: 1 mM.
diethylaluminium chloride: 3 mM.
butadiene: 7 g.
pentadiene: 9 g.

7.9 g. of a trimer fraction is obtained. The open-chain oligomer selectivity is 35%, and the open-chain oligomers comprise:

n-$C_{13}$ tetraene: 82%
i-$C_{14}$ tetraene: 5%
n-$C_{14}$ tetraene: 13%

Example 14

The procedure of Example 1 is followed, except that the materials used are:

benzene: 40 cc.
titanium tetrachloride: 1 mM.
tri-2-bromoethyl phosphite: 1 mM.
diethylaluminium chloride: 3 mM.
butadiene: 7 g.
pentadiene: 9 g.

9.1 g. of a trimer fraction is obtained. The open-chain oligomer selectivity is 56%, and the open-chain oligomers comprise:

n-$C_{13}$ tetraene: 81%
i-$C_{14}$ tetraene: 6%
n-$C_{14}$ tetraene: 13%

Example 15

The procedure of Example 1 is followed, except that the material used are:

benzene: 40 cc.
titanium butoxytrichloride: 1 mM.
tri-2-chloroethyl phosphite: 1 mM.
diethylaluminium chloride: 4 mM.
butadiene: 7 g.
pentadiene: 9 g.

9.3 g. of a trimer fraction is obtained. The open-chain oligomers comprise:

n-$C_{13}$ tetraene: 82%
i-$C_{14}$ tetraene: 6%
n-$C_{14}$ tetraene: 12%

Example 16

Substitution of diethylaluminium chloride by ethylaluminium sesquichloride in the procedure of Example 2 produces 4.1 g. of a trimer fraction, the open-chain oligomer selectivity being 38%. The open-chain oligomers thus produced comprise:

n-$C_{13}$ tetraene: 92%
i-$C_{14}$ tetraene: 3%
n-$C_{14}$ tetraene: 5%

Example 17

In the procedure of Example 4, the ratio of triphenyl phosphite (TPP) to titanium tetrachloride (TTC) is varied.

The result obtained is as follows:

| TPP/TCC mole ratio | Trimer fraction (grams) | Open-chain oligomer selectivity (percent) |
|---|---|---|
| 1.2 | 8.5 | 60 |
| 1.5 | 6.5 | 66 |

Reference Example 1

This example shows that the conventional catalysts known for the cyclo-trimerization of 1,3-butadiene give few open-chain oligomers out of a mixture of 1,3-butadiene and 1,3-pentadiene, compared with the result obtained according to the present invention.

| Catalyst [1] | Trimer yield (percent) | Open-chain oligomer selectivity (percent) |
|---|---|---|
| (1) $AlEt_2Cl+TiCl_4$ | 34 | 5 |
| (2) $AlEt_2Cl+TiCl_4$ and $P(C_6H_5)_3$ | 71 | 16 |
| (3) [2] $AlEt_2Cl$ and $Ti(OBu)Cl_3$ . $P(OC_6H_4CH_3)$. | 76 | 64 |

[1] Et=ethyl; Bu=butyl.
[2] A catalyst according to the present invention.

Of the open-chain oligomers, the highest yield is usually exhibited by the $C_{13}$ tetraene. The $C_{13}$ tetraene is a co-trimer of 2 moles of butadiene and 1 mole of pentadiene, and is characterized in that it is exclusively a normal isomer. The $C_{14}$ tetraene, which is a co-trimer of 1 mole of butadiene and 2 moles of pentadiene, is produced in the form of a normal isomer with a small amount of iso-isomer.

Reference Example 2

The procedure of Example 4 was followed except that triphenyl phosphine was used instead of triphenyl phosphite. The trimer fraction was 11.3 g., but the open-chain oligomer selectivity was only 16%.

In the case where the phosphorus compound was not used, the trimer fraction was 5.4 g. and the open-chain selectivity was only 5%.

Reference Example 3

The procedure of Example 1 was followed except that several diene mixtures were used. The result obtained was as follows:

| No. | Diene | Main product | Open-chain oligomer selectivity (percent) |
|---|---|---|---|
| (1)* | 1,3-butadiene and 1,3-pentadiene | Open-chain | 64 |
| (2) | 1,3-butadiene and isoprene | Cyclic | 3 |
| (3) | 1,3-butadiene and 1,3-hexadiene | Open-chain dimer | 1 |
| (4) | 1,3-butadiene and 1,4-pentadiene | Cyclic | 4 |
| (5) | 1,3-butadiene and 1,5-hexadiene | do | Trace |

*This invention.

What we claim is:

1. An open-chain oligomer which is an oligomer selected from the group of a $C_{13}$ co-oligomer of 1,3-butadiene and 1,3-pentadiene and a $C_{14}$ co-oligomer of 1,3-butadiene and 1,3-pentadiene.

2. An open-chain oligomer as claimed in claim 1 wherein said co-trimer is tridecatetraene.

3. An open-chain oligomer as claimed in claim 1 wherein said co-trimer is tetradecatetraene.

4. An open-chain oligomer as claimed in claim 3 wherein said tetradecatetraene is isotetradecatetraene which boils at 80 to 82° C./2.5 mm. Hg.

5. An open-chain oligomer as claimed in claim 3 wherein said tetradecatetraene is normal tetradecatetraene which boils at 82 to 84° C./2.5 mm. Hg.

6. Normal tridecatetraene-(2,4,7,11).

7. A process for producing an open-chain oligomer of 1,3-butadiene with 1,3-pentadiene which comprises causing a mixture of 1,3-butadiene and 1,3-pentadiene to contact a catalyst resulting from the combination of:

(I) a phosphorus compound selected from the group consisting of (1) phosphate ester derivatives of the formula $PO(OR)_3$ and (2) phosphite ester derivatives of the formula $P(OR)_3$, (II) a titanium compound of the formula $$Ti(OR')_n X_{4-n}$$

and

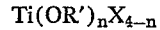

(III) an aluminium compound of the formula $AlR''_l Y_m$, thereby to oligomerize said dienes into an open-chain oligomer, in which formula R is a member selected from the group consisting of alkyls, aryls, haloalkyls, and haloaryls and contains from 1 to 10 carbon atoms, R' is a member selected, independently of the R, from the group consisting of alkyls and aryls and contains from 1 to 10 carbon atoms, X is a halogen, $n$ is any one of the values 0, 1, 2, 3, and 4, R'' is a member selected, independently of the R and R', from the group consisting of alkyls and aryls and contains from 1 to 10 carbon atoms, Y is a halogen independent of X, $l+m$ is 3 and $l$ is any one of the values 1.5, 2, and 3 and $m$ is any one of the values 0.1 and 1.5.

8. A process for producing an open-chain oligomer as claimed in claim 7 wherein said catalyst is prepared by admixing said three components (I), (II) and (III).

9. A process for producing an open-chain oligomer as claimed in claim 8 wherein said components (I) and (II) are admixed to form a complex and then said component (III) is incorporated with the complex.

10. A process for producing a co-trimer of 1,3-butadiene with 1,3-pentadiene which comprises causing a mixture of 1,3-butadiene and 1,3-pentadiene to contact a catalyst made of a complex (A) resulting from the contacting of a phosphorus compound (I) selected from the group consisting of phosphate ester derivatives of the formula $PO(OR)_3$, (1) and phosphite ester derivatives of the formula $P(OR)_3$, (2) with a titanium compound of the formula $Ti(OR')_n Cl_{4-n}$(II) and an aluminium compound (B) of the formula $AlR''_l Cl_m$, thereby to oligomerize said dienes into a co-trimer thereof, in which formulas R is an alkyl, an aryl, a haloalkyl, or a haloaryl, the halo being chloro or bromo, each containing 1 to 10 carbon atoms, R' is same with or different from R and is an alkyl or aryl each containing 1 to 10 carbon atoms, $n$ is 0, 1, 2, 3 or 4, R'' is same with or different from R or R' and is an alkyl or an aryl each containing 1 to 10 carbon atoms, $l+m$ is 3 and $l$ is 1.5, 2 or 3 and $m$ is 0, 1 or 1.5.

11. A process for producing a co-trimer as claimed in claim 10 wherein said mixtures of dienes are caused to contact the catalyst in a liquid hydrocarbon medium.

12. A process for producing a co-trimer as claimed in claim 10 wherein said catalyst component (I) is selected from the group consisting of triphenyl phosphite, tricresyl phosphite, tri-2-chloroethyl phosphite, tri-2-bromoethyl phosphite, triphenyl phosphate, tricresyl phosphate, and trilower alkyl phosphate.

13. A process for producing a co-trimer as claimed in claim 10 wherein said catalyst component (II) is selected from the group consisting of titanium tetrachloride, titanium alkoxytrichloride containing from 1 to 6 carbon atoms, and titanium tetraalkoxide containing from 1 to 6 carbon atoms.

14. A process for producing a co-trimer as claimed in claim 10 wherein said catalyst component (III) is selected from the group consisting of dialkylaluminum chloride and containing from 1 to 6 carbon atoms and trialkylaluminum containing from 1 to 6 carbon atoms.

References Cited

UNITED STATES PATENTS

| | | | |
|---|---|---|---|
| 3,219,716 | 11/1965 | Wittenberg et al. | 260—666 |
| 3,457,319 | 7/1969 | Olechowski et al. | 260—677 |
| 3,372,206 | 3/1968 | Pruett et al. | 260—666 |
| 3,088,985 | 5/1963 | Wilke | 260—677 |

FOREIGN PATENTS

| | | | |
|---|---|---|---|
| 12,697 | 1965 | Japan | 260—666 B |

DELBERT E. GANTZ, Primary Examiner

J. M. NELSON, Assistant Examiner

U.S. Cl. X.R.

260—666 B